(No Model.) 3 Sheets—Sheet 1.
F. L. CAPPS.
CONDUIT FOR ELECTRIC CONDUCTORS FOR RAILWAYS.
No. 544,283. Patented Aug. 13, 1895.

Witnesses
Robert Sollberger
Louise L. Browne

Inventor:
Frank L. Capps,
By Drake & C, Atty's.

(No Model.) 3 Sheets—Sheet 2.

F. L. CAPPS.
CONDUIT FOR ELECTRIC CONDUCTORS FOR RAILWAYS.

No. 544,283. Patented Aug. 13, 1895.

Witnesses
Robert Sollberger
Louise L. Brown

Inventor
Frank L. Capps,
By Drake & Co. Atty's.

(No Model.) 3 Sheets—Sheet 3.
F. L. CAPPS.
CONDUIT FOR ELECTRIC CONDUCTORS FOR RAILWAYS.
No. 544,283. Patented Aug. 13, 1895.

Witnesses Inventor:
Robert Sollberger Frank L. Capps,
Louis L. Brown By Drake & Co. Atty's

UNITED STATES PATENT OFFICE.

FRANK L. CAPPS, OF NEWARK, NEW JERSEY.

CONDUIT FOR ELECTRIC CONDUCTORS FOR RAILWAYS.

SPECIFICATION forming part of Letters Patent No. 544,283, dated August 13, 1895.

Application filed September 18, 1894. Serial No. 523,317. (No model.)

*To all whom it may concern:*

Be it known that I, FRANK L. CAPPS, a citizen of the United States, residing at Newark, in the county of Essex and State of New Jersey, have invented certain new and useful Improvements in Conduits for Electric Conductors for Railways; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to secure, in underground circuits for electric cars, high insulation of the conductors at a low cost of construction, to simplify the construction so that there will be less liability to disarrangement, to render the working parts more accessible and easy of adjustment and inspection, and to obtain other advantages and results, some of which will be referred to hereinafter in connection with the description of the working parts.

The invention consists in the improved electric conduit, and in the arrangements and combinations of parts, all substantially as will be hereinafter set forth, and finally embraced in the clauses of the claim.

Figure 1:
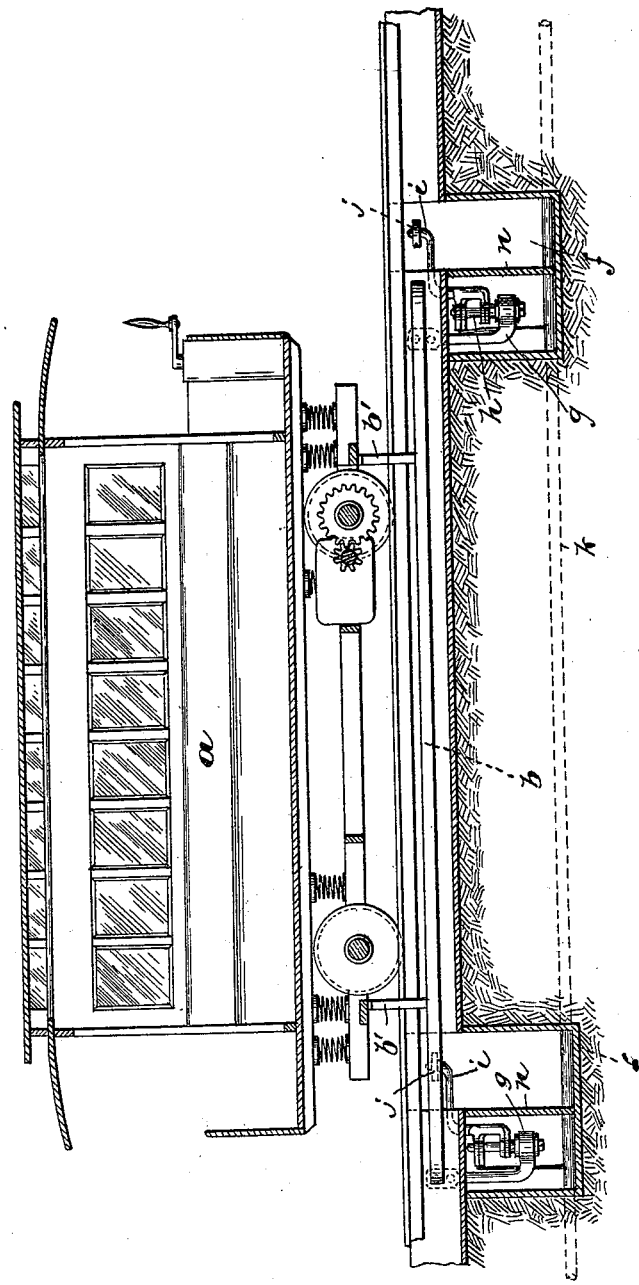
Figure 2:
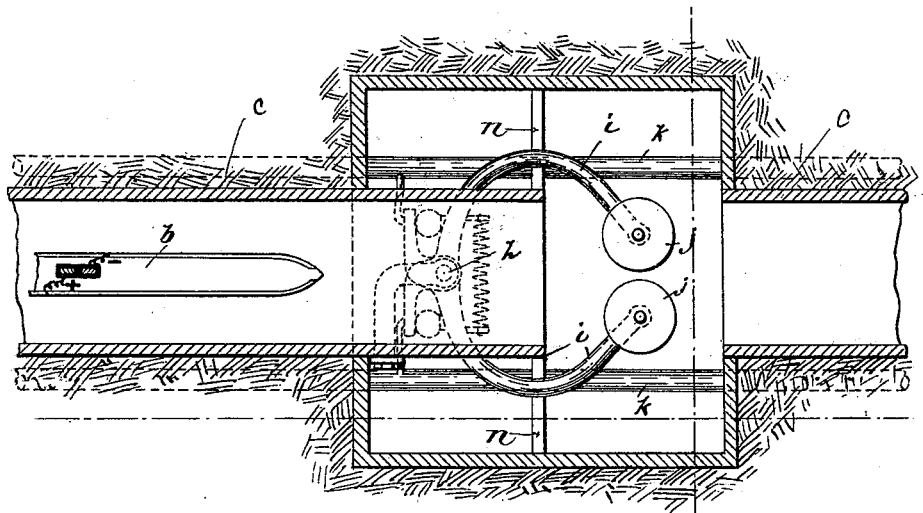
Figure 3:
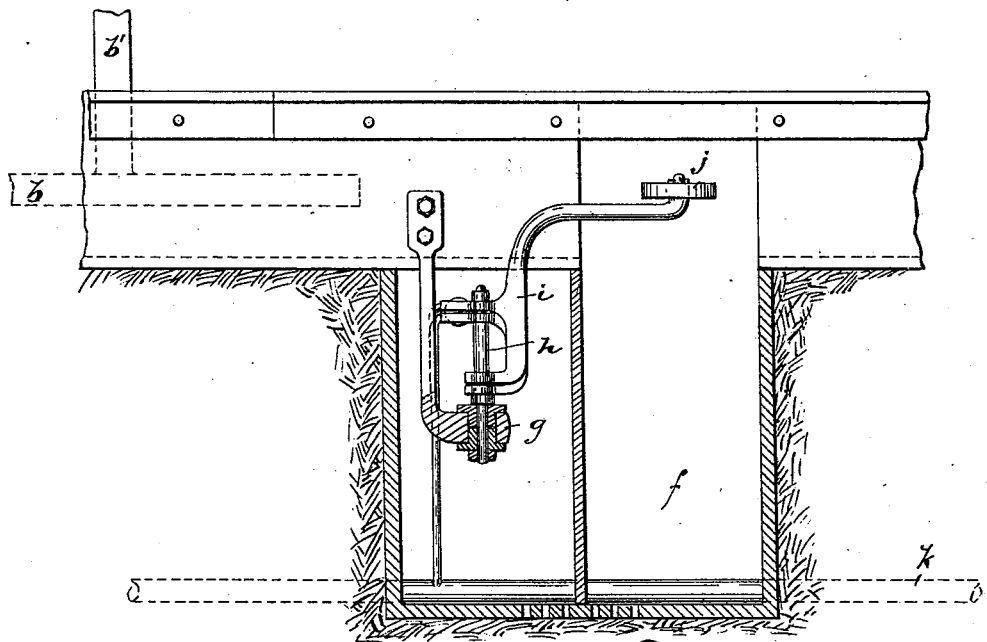
Figure 4:
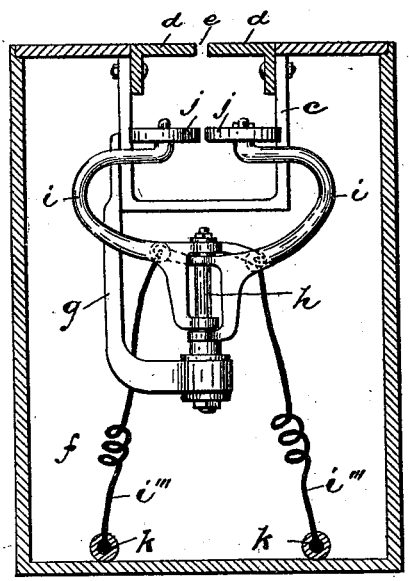
Figures 5, 6:
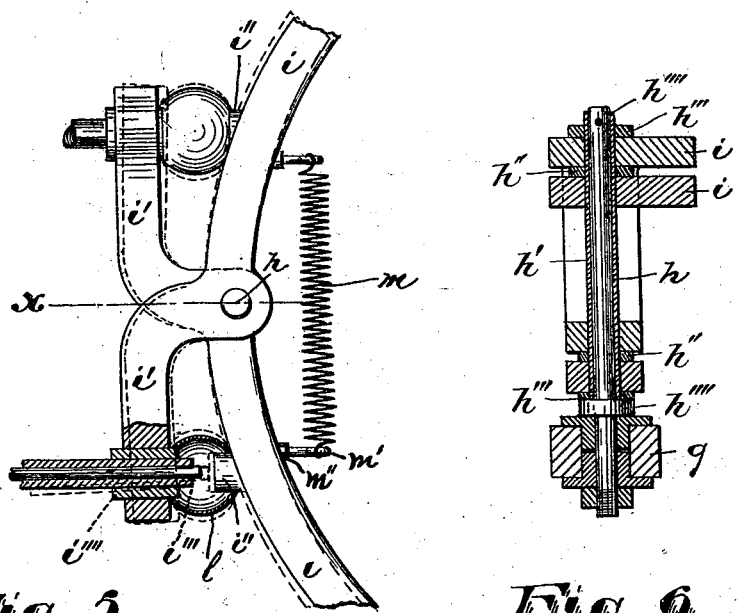

Referring to the accompanying drawings, in which like letters indicate like parts in each of the several figures, Figure 1 is a vertical section showing the general relation of the car to the conduit. Fig. 2 shows in plan and section the construction of the conduit-contacts and a portion of the contact-shoe of the approaching car. Fig. 3 is an elevation and vertical section of the same. Fig. 4 is a transverse section of the conduit and end view of the contact device. Fig. 5 is an enlarged detail showing the method more clearly of insulating the contact-points or extremities, and protecting them from exposure to moisture, whereby their efficiency would be reduced; and Fig. 6 is a section at line $x$.

In said drawings, $a$ indicates the electric car having the ordinary electric motor or motors and electric connections for employment with either a metallic or ground circuit, and $b$ indicates a contact-shoe depending from the under side of said car or the truck thereof and held in proper position in the conduit by hangers $b'$ $b'$ in any suitable manner. The said contact-shoe is preferably of the length of the car and is constructed of any insulating material with conducting surfaces or strips at the sides, the said shoe being tapered or wedge-shaped at its opposite ends, so as to secure an easy entrance of said shoe between the contacts of the conduit. The conducting-surfaces of the shoe are in metallic circuit or are electrically connected with the motor of the car.

The conduit consists of rolled iron $c$, substantially U-shaped in cross-section, the upwardly-extending longitudinal flanges of which provide bearings for angle-iron top pieces $d$ $d$, the upper horizontal flanges of which latter extend toward one another and form a narrow slot $e$ through which the hangers of the contact-shoe travel with the car.

At every twenty feet, more or less, (the length of a car,) the longitudinal conduit-iron $c$ is interrupted in its course by manholes, or contact apparatus chambers $f$, which may be of brick, tile, metal, or other suitable material, and into each of said chambers one of the irons $c$ extends, as shown in Fig. 3. To the said inwardly-extending end is secured a bracket $g$, carrying an insulated shaft $h$, on which are pivoted upwardly-curved arms $i$ having contact-rollers $j$ $j$, which are normally insulated from one another and from the main conducting-wires $k$ $k$ when the device is employed with a metallic circuit. The arms $i$ $i$ are insulated from the shaft $h$ and the arms from one another, as indicated in Fig. 6, by any suitable insulating material— such, for example, as hard rubber—a tube or bushing $h'$ of insulation preferably inclosing said shaft and extending through said arms, and washers $h''$ $h''$ being arranged between said arms where they are held upon said shaft or the tube or bushing surrounding the same. Washers $h'''$ of insulation electrically disconnect the said arms from shoulders or bearings $h''''$ $h'''''$ of said shaft. Said upwardly-curved arms $i$ are provided with extensions $i'$, which are related to the roller-carrying portions as the handles of shears are related to the cutting parts thereof, the parts crossing at the pivot, so that the extension of one arm lies adjacent to the body of the other. Said parts are provided with terminals, which are normally out of contact, but when the contact-shoe of the car passes between the rollers $j$ and spreads the arms said terminals are brought into electrical connection, so that the main conducting-wires are brought into circuit with the motors of the car, as will be understood.

$i''$ indicates the terminals of the bodies of the arms, and $i'''$ are the insulated terminals of the extensions $i'$, which are the ends of branch wires connected with the main conducting-wires $k$. Said terminals $i'''$ are not only insulated by the ordinary insulation found thereon, but insulated bushings $i''''$ are employed to more fully prevent the escape of electric power thereat.

To protect the contact-surfaces from moisture and prevent leakage of current, and yet allow the play necessary to enable the said terminals to make or break contact when operated by the passing car, I have employed rubber balls, which are perforated at opposite sides and receive the terminals $i''$ $i'''$ closely hugging said terminals, so that no moisture can enter to affect the same. The elasticity of the rubber admits of the desired movements. When worn the ball-protector can be quickly and cheaply replaced by simply compressing the rubber, so that the ball is detached from the terminals, and substituting a new ball for the worn one.

A spring $m$ serves to hold the arms $i$ normally out of contact and also forces the rollers $j$ $j$ positively into contact with the shoe. The spring is insulated from the arms by any suitable means, the means preferred being shown in Fig. 5, where the eye-bolts $m'$ at the ends of the springs are inserted in insulation $m''$ carried by said arms.

Within the manholes I may provide vertical partitions $n$ to prevent the dirt swept by the shoe or by a brush carried by the same from falling upon the pivoted parts of the contact-arms and interfering with their operation. The projecting part of the conduit serves to throw said dirt on the outer side of said partition away from said pivotal parts.

In operating the device the contact-shoe $b$ when moving through the conduit forces the pairs of contact-wheels apart, one pair after another, said shoe always remaining in contact with at least one pair. The operation of forcing the contact-wheels away from one another brings the terminals together, so that the current from the main wires may be conducted to the motors.

The invention may be employed with either a metallic or a ground circuit, as will be evident, by simply omitting one of the main wires and one of the ball-protected contacts and allowing the arms and the outer wire to act as the main or metallic portion of the circuit and the ground or rails thereon as the return circuit in any ordinary and well-known manner.

Having thus described the invention, what I claim as new is—

1. In a conduit for electric cars, the combination with pairs of separable arms having extensions carrying terminals adapted to be brought into electrical connection, of a compressible protector covering said terminals, substantially as set forth.

2. In a conduit for electric cars, the combination with a slotted conduit box or wire and circuit connections, $k$, a pair of pivoted terminal carriers disposed at intervals in said conduit iron adapted to be operated by a moving shoe connected with the car to bring the terminals into electrical connection, of elastic protectors arranged within said conduit iron and extending over the terminals, substantially as set forth.

3. In a conduit for electric cars, normally open electrical contact devices having arms extending upward into the plane of the horizontally movable car shoe, said arms being adapted to be spread apart by said shoe, and having terminals adapted to be closed by the operation of said arms, substantially as set forth.

4. The combination with the conduit irons forming a slotted passage for the car shoe, of man holes arranged at substantially uniform distances apart, the said irons projecting into said holes and forming bearings for a bracket, $g$, carrying a shaft, $h$, shear-like arms pivoted on said shaft and extending into the plane of the said shoe passage and carrying terminals adapted to be brought into contact by the operation of said arms, substantially as set forth.

5. The combination with the conduit iron forming a slotted passage for the car shoe, of man holes arranged at substantially uniform distances apart, shear-like arms arranged at the said man holes and extending into the plane of the said shoe passage to be operated by the moving shoe, the extensions of said arms, opposite those engaged by the shoe, carrying electric circuit terminals which are changed in relation by the shoe engagement to affect the circuit, substantially as set forth.

6. The combination with a slotted conduit, having at intervals therein brackets, $g$, with vertical shafts, $h$, of separable arms pivoted on said shaft but insulated therefrom and between which the car shoe may pass, and produce an effective operation of said arms, and terminals of an electric circuit adapted to be brought into electrical contact by the operation of said arms, substantially as set forth.

7. The combination with the slotted conduit, of separable arms arranged at intervals in the length of the main conducting wire in electrical connection with said main conducting wire and insulated from one another, said arms being pivoted and bent to move horizontally in a plane near the slot of the conduit, said conducting wire, contact rollers arranged on said arms, and springs connecting the arms of each pair to prevent undue separation and hold said arms in electrical contact with the shoe of the car, substantially as set forth.

8. The improved electrical conductor and conduit herein described in which is combined with the U-shaped irons having angle irons at the top secured to the upwardly extending flanges of said U-shaped irons and forming a central slot through which the car connections pass, of brackets secured at openings or breaks in the said U-shaped iron, shafts, $h$, curved arms pivoted on said shafts and extending up into the plane of said U-shaped iron and thereat having contact rollers, said arms having extensions, $i'$, $i'$, terminals, $i''$, $i'''$, normally out of contact and one of which is in electrical connection with the main conductor, said main conductor, elastic coverings imperviously covering said terminals and interposed between said arms and the extensions thereof, and springs, $m$, holding said terminals normally separate and said rollers in contact with the car shoe, substantially as set forth.

In testimony that I claim the foregoing I have hereunto set my hand this 12th day of September, 1894.

FRANK L. CAPPS.

Witnesses:
  CHARLES H. PELL,
  LOUISA L. BROWNE.